United States Patent [19]
Sugiyama et al.

[11] Patent Number: 5,790,743
[45] Date of Patent: Aug. 4, 1998

[54] APPARATUS AND METHOD FOR EDITING ISOCHRONOUS INFORMATION TRANSMITTED AMONG VARIOUS DEVICES

[75] Inventors: Koichi Sugiyama, Kanagawa; Hisato Shima, Chiba; Harumi Kawamura, Tokyo, all of Japan

[73] Assignee: Sony Corporation, Tokyo, Japan

[21] Appl. No.: 519,941

[22] Filed: Aug. 28, 1995

[30] Foreign Application Priority Data

Aug. 30, 1994 [JP] Japan ................................ 6-228942

[51] Int. Cl.$^6$ ........................................ H04N 5/93
[52] U.S. Cl. ........................ 386/52; 386/62; 360/13; 360/15
[58] Field of Search ................... 360/13, 14.1, 14.2, 360/14.3, 15; 358/311; 369/83; 370/85.1, 85.7, 85.8, 85.11, 85.9; 386/52, 62

[56] References Cited

U.S. PATENT DOCUMENTS

| | | | |
|---|---|---|---|
| 5,199,030 | 3/1993 | Ueda | 386/96 |
| 5,461,611 | 10/1995 | Drake, Jr. et al. | 370/54 |
| 5,535,208 | 7/1996 | Kawakami et al. | 370/84 |

FOREIGN PATENT DOCUMENTS

| | | |
|---|---|---|
| 0 467 305 A | 1/1992 | European Pat. Off. . |
| 0 522 445 A | 1/1993 | European Pat. Off. . |
| 38 20 835 A | 1/1989 | Germany . |
| 6-209332 | 7/1994 | Japan . |

OTHER PUBLICATIONS

Patent Abstracts of Japan vol. 017, No. 060 (P-1482), Feb. 5, 1993 Fumitiko et al. Remote Video Editing Method.
Patent Abstracts of Japan vol. 018, No. 570 (E-1623), Oct. 31, 1994, Shinichi et al., Isochronous Information Transfer System for Bus Type Distributed Switching Network.

Electronic Design, vol. 42, No. 5, Mar. 7, 1994, pp. 114–117, XP000441329 Bursky D: "Chip Set Simplifies High–Speed Interconnects the Fist Ics to Realize the P1394 Serial–Bus Standard Let Designers Build Serial Connections Running at 100 to 400 Mbits/S".

Tenner M. : "A Bus On A Diet –The Serial Bus Alternative An Introduction To The P1394 High Performance Serial Bus" Feb. 24, 1992, Intellectual Leverage, San Francisco, Feb. 24–28, 1992 NR. Electrical And Electronics Engineers XP000340753 190900.

IEEE –High Performance Serial Bus printed Oct. 14, 1993 P1394/Draft 6.4v0, pp. 179–192.

*Primary Examiner*—Andrew L. Sniezek
*Attorney, Agent, or Firm*—Frommer Lawrence & Haug LLP; William S. Frommer

[57] ABSTRACT

An apparatus and method for editing isochronous communication data used for communication between various electronic devices. An editing procedure with high accuracy can be conducted without reading the system data of isochronous communication in a system having co-existing isochronous and asynchronous modes of communication for data transmission between the electronic devices. The editing procedure can also be conducted with high accuracy in a system in which an edit controlling device cannot recognize the frame boundary in the information signals. Furthermore, even if there are various time delays associated with the instruction reception and the instruction execution by an electronic device, the editing procedure can be conducted with high accuracy.

9 Claims, 8 Drawing Sheets

① , ② : COMMAND RECEIVING TIME

③ : EXECUTION START TIMING
 UPON RECEIVING COMMAND AT ①

④ : EXECUTION START TIMING
 UPON RECEIVING COMMAND AT ②

—— P1394 SERIAL BUS

FIG. 11

CSP : CYCLE START PACKET
Iso : ISOCHRONOUS COMMUNICATION PACKET
Async : ASYNCHRONOUS COMMUNICATION PACKET

FIG. 12

1 : OPERATION SECTION
2 : DISPLAY SECTION

APPARATUS AND METHOD FOR EDITING ISOCHRONOUS INFORMATION TRANSMITTED AMONG VARIOUS DEVICES

CROSS-REFERENCE TO RELATED APPLICATIONS

This application is related to the following U.S. patent applications: Ser. No. 08/183,396 abandoned; Ser. No. 08/373,279 pending; Ser. No. 08/403,708 abandoned; Ser. No. 08/391,019 U.S. Pat. No. 5,563,886; Ser. No. 08/449,784 U.S. Pat. No. 5,621,725; Ser. No. 08/502,772 U.S. Pat. No. 5,710,713; and Ser. No. 08/506,477 pending.

BACKGROUND OF THE INVENTION

The present invention relates to a method of editing isochronous communication data and an edit controlling device used therefor in a system of a plurality of electronic devices connected by a communication control bus in which isochronous and asynchronous modes of communication can co-exist for data transmission between the electronic devices.

A system has been considered for connecting a plurality of devices via a communication control bus in which isochronous communication and asynchronous communication can be present together, such as a serial bus according to the IEEE-P1394 standard (hereinafter simply referred to as "P1394 serial bus") for communication between the devices. Details of the P1394 serial bus are disclosed in "IEEE P1394 Serial Bus Specification"(published on Oct. 14, 1993).

Figure 10:
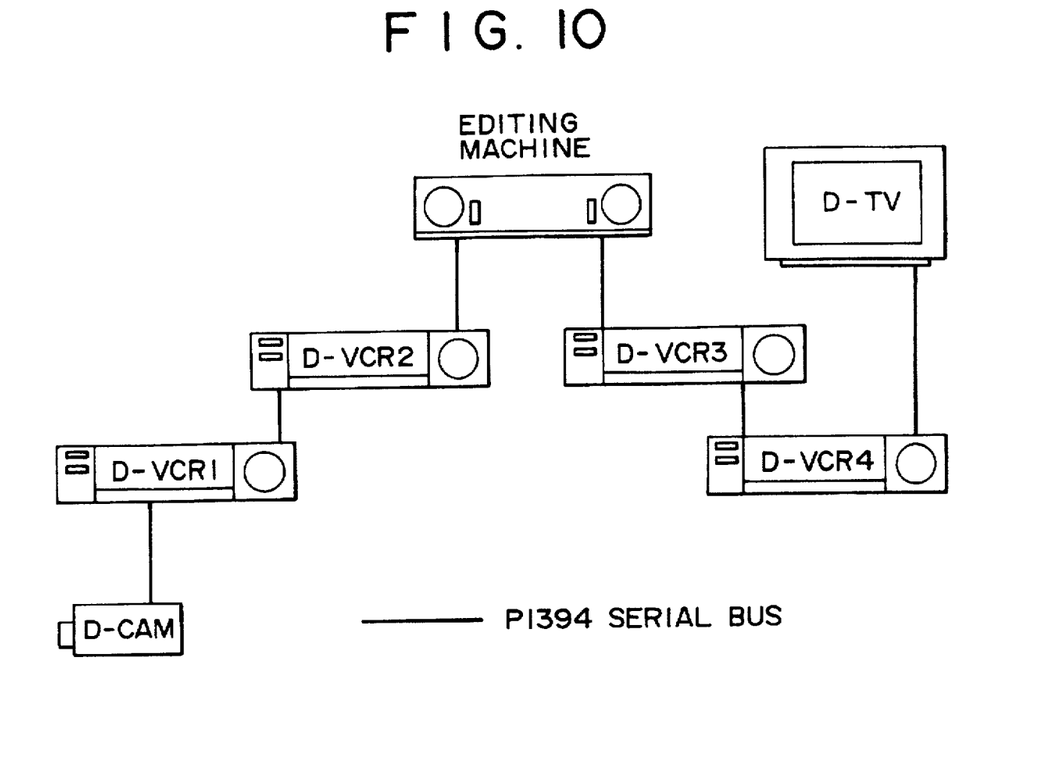
FIG. 10 is a diagram illustrating an example of a communication system in which a plurality of devices are connected by a P1394 serial bus.

FIG. 10 shows an example of such a system. The system comprises four digital video cassette recorders (hereinafter referred to as "D-CAM"), an editing machine (hereinafter referred to as edit controller) and a digital television receiver (hereinafter referred to as "D-TV"). The devices are connected to each other by a cable using the P1394 serial bus transmission. Since each of the devices has a function of relaying signals transmitted via the cable of the P1394 serial bus, the communication system is equivalent to a communication system in which each of the devices is connected to a common P1394 serial bus.

Figure 11:
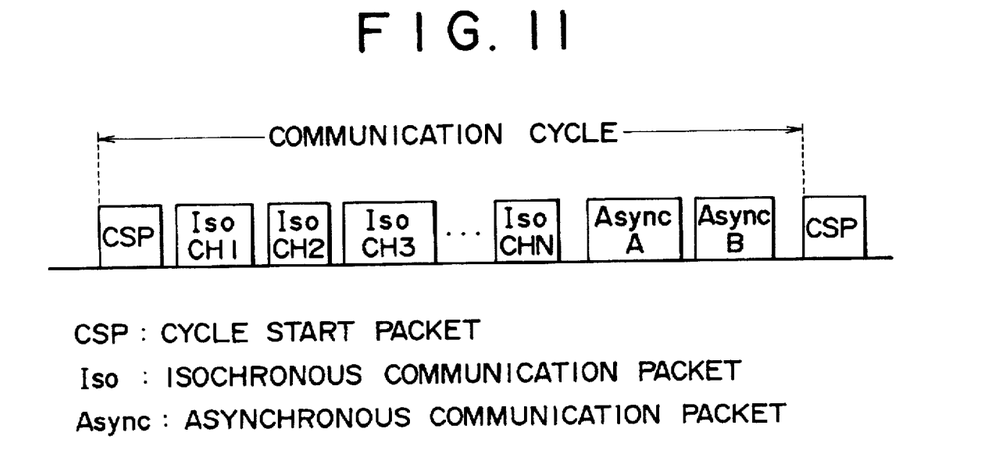
FIG. 11 is a diagram illustrating an example of a communication cycle in the P1394 serial bus.

Signal transmission in the devices having a common bus is conducted by the time division multiplexing on every predetermined communication cycle as shown in FIG. 11 (for example, every 125 µs). For the bus management of the communication cycle, a device referred to as a cycle master transmits a synchronization packet indicating the starting point of the communication cycle (cycle start packet: hereinafter referred to as the "CSP") to other devices on the bus. The CSP designates the start of data transmission in the communication cycle. The cycle master is automatically determined by a method specified according to the IEEE-P1394 standard.

Transmission of signals during one communication cycle includes two modes: isochronous communication for periodically transmitting, for example, video data or audio data and asynchronous communication for transmitting, for example, a connection control command, not periodically but as necessary. The isochronous communication data is transmitted prior to the asynchronous communication data. Channel identification 1, 2, 3, N is provided with each of isochronous communication packets to distinguish among a plurality of isochronous communication packets. After completing the transfer of the isochronous communication packets of all channels, a period of time until the next CSP is used for the transmission of an asynchronous communication packet.

Figure 12:
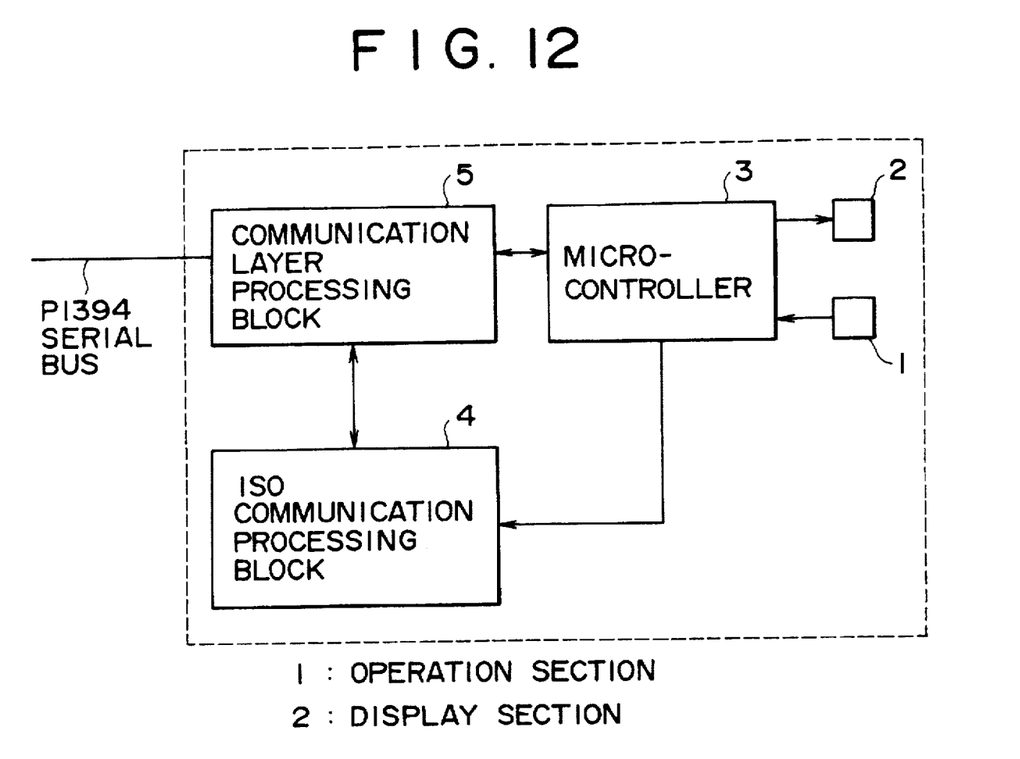
FIG. 12 is a schematic block diagram of a device connected to the P1394 serial bus.

FIG. 12 shows a schematic block diagram for each of the devices of FIG. 10. Each device comprises an operation section 1, a display section 2, a microcontroller 3, an isochronous communication data processing block 4 and a communication layer processing block 5. However, the editing machine has no isochronous communication data processing block 4.

The operation section 1 has keys or the like to enable the user to operate the device. The display section 2 displays, for example, the operational state of the device. The microcontroller 3 reads the state of the operation section 1 and prepares various commands for transmitting the desired instructions to other devices. Further, when it receives various types of commands from other devices, the microcontroller 3 controls the isochronous communication data processing block 4 or the communication layer processing block 5 for executing the processing corresponding to the received command. Further, the microcontroller 3 controls the display in the display section 2 in accordance with the operational state of the device.

The isochronous communication data processing block 4 is a recording/regeneration processing section or a tuner section for digital audio/video signals if the device is D-VTR, a monitor section or a tuner section if the device is D-TV, or a recording/regeneration processing section or a camera section for digital audio/video signals if the device is D-CAM.

The communication layer processing block 5 conducts processing operations for converting an isochronous or asynchronous communication packet between the P1394 serial bus format and the format used by the isochronous communication data processing block 4 or the microcontroller 3. The communication layer processing block 5 may also perform arbitration processing for a physical layer and a link layer, such as obtaining or aborting the right to use the P1394 serial bus.

In the communication system of FIG. 10, the editing procedure is conducted, for example, by using D-VCR 1 as a playback machine, and D-VCR 2 as a recording machine via the control of the editing machine. The editing in this case is an assemble mode editing by a so-called 1:1 edit system of dubbing signals regenerated from a video tape (original tape) of a playback machine by superimposing the signals on a portion of an already recorded area on the video tape (master tape) of the recording machine.

Figure 13A:
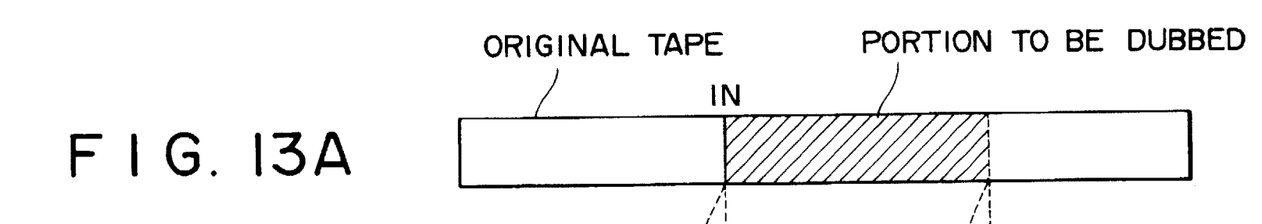
FIGS. 13A–13D are diagrams illustrating a relevant editing method.
Figure 13B:
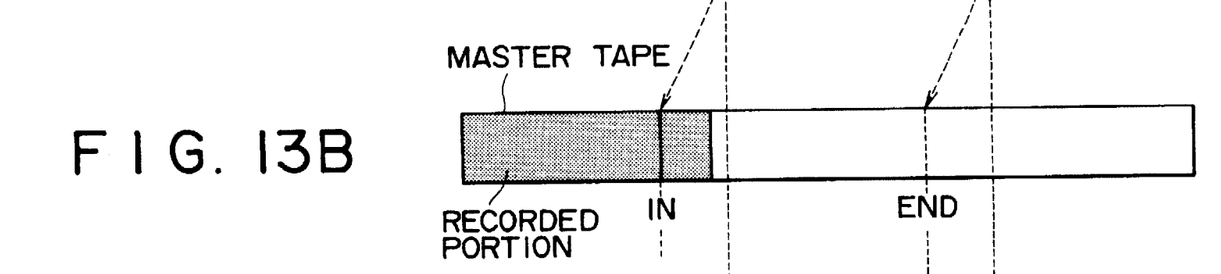
Figure 13C:
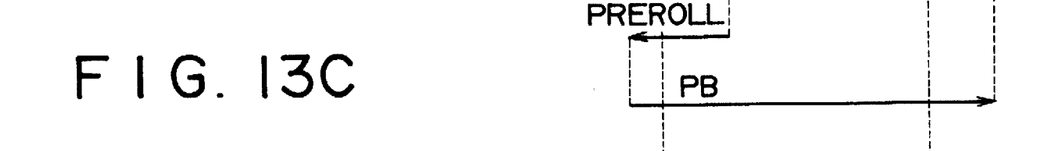
Figure 13D:
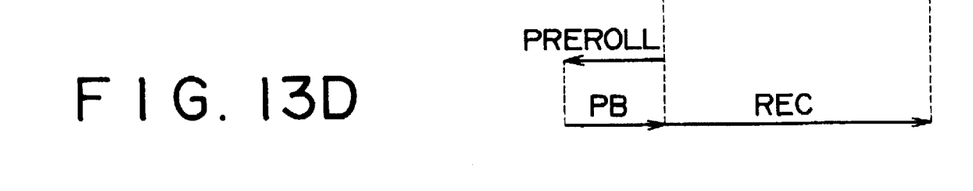

In this case, as shown in FIGS. 13C and 13D, the editing machine at first controls the playback machine and the recording machine such that the original tape and master tape are prerolled from their respective regeneration/recording IN points. Then, the editing machine sets the playback machine and the recording machine to the regenerating mode and, subsequently, sets the recording machine to a recording mode simultaneously with the arrival of the IN point. Then, when the required portion is recorded on the master tape, the recording operation is stopped. In this case, external synchronization is applied to the recording machine via a frame sync signal in the regenerated video signals of the playback machine. The operation of the playback machine and the recording machine is controlled such that the instances at which respective tape positions reach the respective IN points coincide with each other.

For conducting such editing with high accuracy, it is necessary for the editing machine to accurately determine tape position information on the playback machine and on the recording machine. It is also necessary for the playback machine and the recording machine to execute an editing control command at the instance designated by the editing machine. Thus, for the editing machine to obtain accurate tape position information on the playback machine and on the recording machine in the system of FIG. 10, it may be necessary to analyze system data added to audio/video data sent by the isochronous communication packet, and to read either an absolute track number (track number appended sequentially from the beginning to the end of the tape to each of the tracks) or a time code. However, for the editing machine to analyze the system data, a hardware equipment is required for separating the system data from the audio/video data and for analyzing the data.

It may also be necessary to request a time code using an inquiry command packet of the asynchronous communication and receive an answer from the corresponding device. However, the time code transmitted by the asynchronous communication packet may sometimes have a delay in relation to the time code in the system data added to the audio/video data transmitted by the isochronous communication packet.

Further, since the command sent from the editing machine to the playback machine and to the recording machine is transmitted by the asynchronous communication packet, there is no time reference for audio/video data. Further, the time at which the editing machine sends a command is different than the time at which the command is actually executed by the playback machine or the recording machine depending on the various conditions such as the type of the command.

Figure 14:
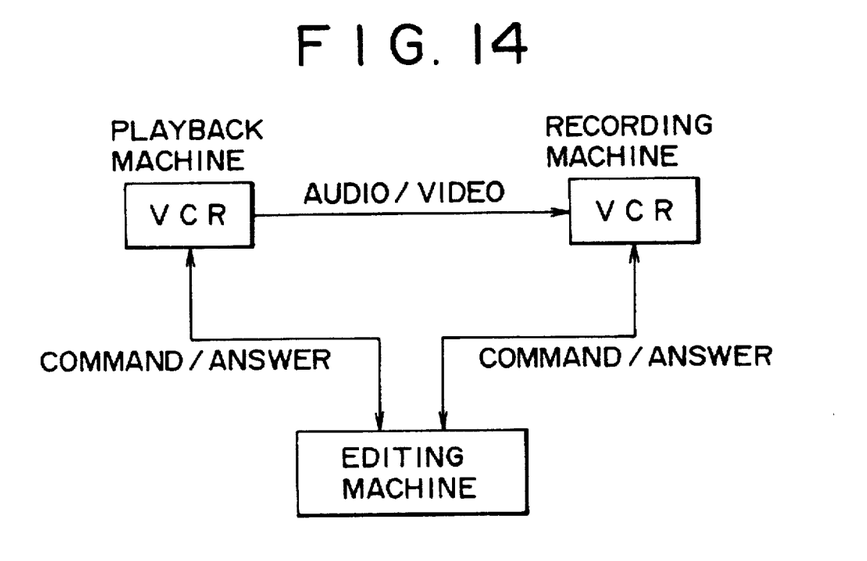
FIG. 14 is a diagram illustrating an example of a relevant editing system.

Although problems have been described in the case of conducting the editing procedure by the communication system of FIG. 10, similar problems also occur in an editing system in which the editing machine cannot recognize the frame boundary in the video signals in an editing system, for example, as shown in FIG. 14, which comprises a plurality of analog or digital VCRs connected by analog or digital audio/video signal lines and an editing machine, connected to them by control signal lines, for sending and receiving the corresponding command/answer.

SUMMARY OF THE INVENTION

The present invention has been accomplished in view of the foregoing problems and it is an object thereof to provide an editing method and an edit controlling device capable of executing the editing procedure with high accuracy without reading system data transmitted via isochronous communication mode.

It is another object of the present invention to provide an editing method and an edit controlling device capable of executing the editing procedure with high accuracy in a system in which an editing machine cannot recognize a frame boundary in video signals.

A further object of the present invention is to provide an editing method and an edit controlling device capable of executing the editing procedure with high accuracy even if there are various time delays from reception of a command to execution thereof in a playback machine and in a recording machine used as the controlled devices.

According to the present invention, an edit controlling device transmits a predetermined instruction at a predetermined timing by asynchronous communication based on first and second delay times (td), (to) and a boundary position information or a third time information (tf). Accordingly, an editing procedure can be conducted with high accuracy without reading the system data of isochronous communication. In addition, the editing procedure can be conducted with high accuracy even if there is a time delay from reception till execution of the instruction in the controlled devices.

Further, according to the present invention, the edit controlling device transmits a predetermined instruction at a predetermined timing via control signal lines based on first and second delay times (td), (to) and boundary position information or third time information (tf). Accordingly, an editing procedure can be executed with high accuracy even in an edit system in which the edit controlling device cannot recognize the frame boundary position information in information signals. Further, the editing procedure can be conducted with high accuracy even if there is a time delay from reception till execution of an instruction in the controlled devices.

As has been described above according to the present invention, the editing procedure with high accuracy can be conducted without reading the system data of isochronous communication in a system in which isochronous communication and asynchronous communication can be present together.

Further, the editing procedure can be conducted with high accuracy also in a system in which the edit controlling device cannot recognize the frame boundary in the information signals. Further, even if there are various time delays from reception till execution of an instruction in the controlled devices, the editing procedure can be conducted with high accuracy.

DETAILED DESCRIPTION OF THE PREFERRED EMBODIMENTS

The present invention will be explained specifically by way of preferred embodiments with reference to the drawings, by describing: (A) time delay from reception till execution of a command, (B) a time from the top of a frame for ensuring the time delay, (C) detection of the top of the frame and (D) an example of an editing method to which the present invention is applied, in this order.

(A) Time delay from reception till execution of a command. As described above, the time at which a control command sent by asynchronous communication is received is different than the time at which the command is actually executed depending on the kind of the control command, the equipment receiving the control command and the operational state of the equipment upon receiving the control command.

Then, the present invention is adapted such that an editing machine requests each of the devices (D-VCR in this embodiment) the necessary time for starting a designated operation from the reception of the control command (hereinafter referred to as "command processing time delay"). The command time delay is defined as td and illustrated in FIG. 1.

Figure 1:
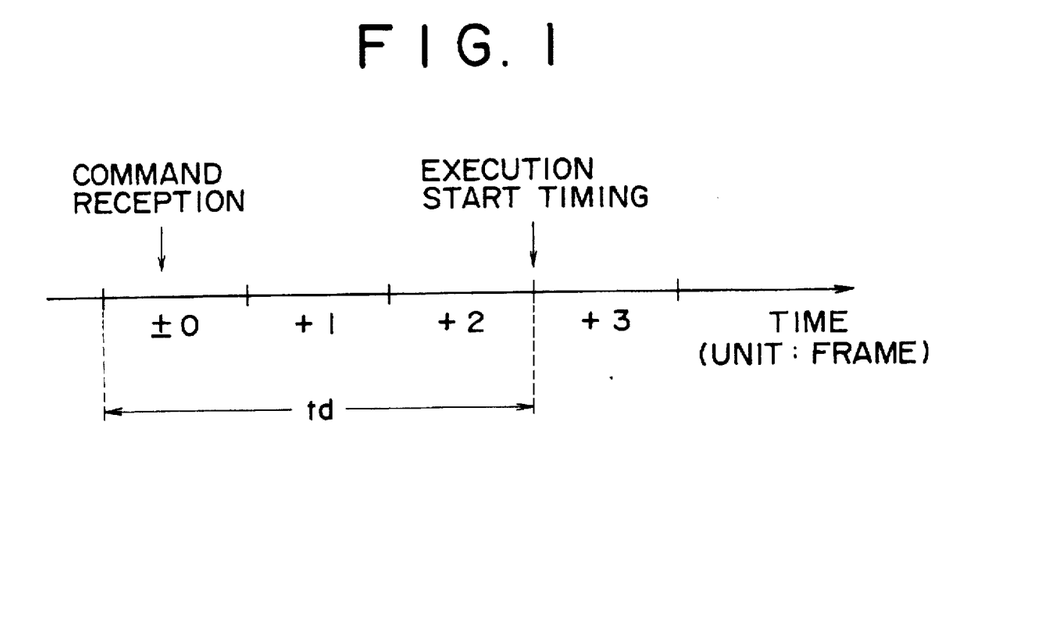
FIG. 1 is a diagram for explaining a command processing time delay.

As shown in FIG. 1, the command processing time delay td is represented on the basis of frame units as time elapsed from the top of the frame receiving the command (an example: td=3 is shown in FIG. 1). An object for the inquiry in this embodiment is the following, which is necessary for the editing control among various kinds of command processing time delays:

(1) Command processing time delay requested from the playback machine:
PB-Pause→PB=Delay-P1
PB→PB-Pause=Delay-P2
External sync PB-Pause→external sync PB=Delay-P3

(2) Command processing time delay requested from the recording machine:
REC-Pause→REC=Delay-R1
REC→REC-Pause=Delay-R2
External sync PB-Pause→external sync PB=Delay-R3
External sync PB→REC=Delay-R4

Since the command processing time delay td can take on a different value with each transition, the editing machine requests all necessary values in accordance with an editing mode from the playback machine and from the recording machine using an asynchronous communication packet.

(B) Time from the top of the frame for ensuring a command processing time delay. The command processing time delay td can thus be obtained. However, since D-VCR is in frame synchronization by reading a header of isochronous communication data, the timing of starting the execution may sometimes be different depending on the position in the frame (time from the top of the frame) of receiving the command. Then, the editing machine requests a time to, illustrating the command sending timing elapsed from the top of the frame, to ensure a proper time delay td in each of the devices. Thus, the command sending timing is determined based on to and td.

Figure 2:
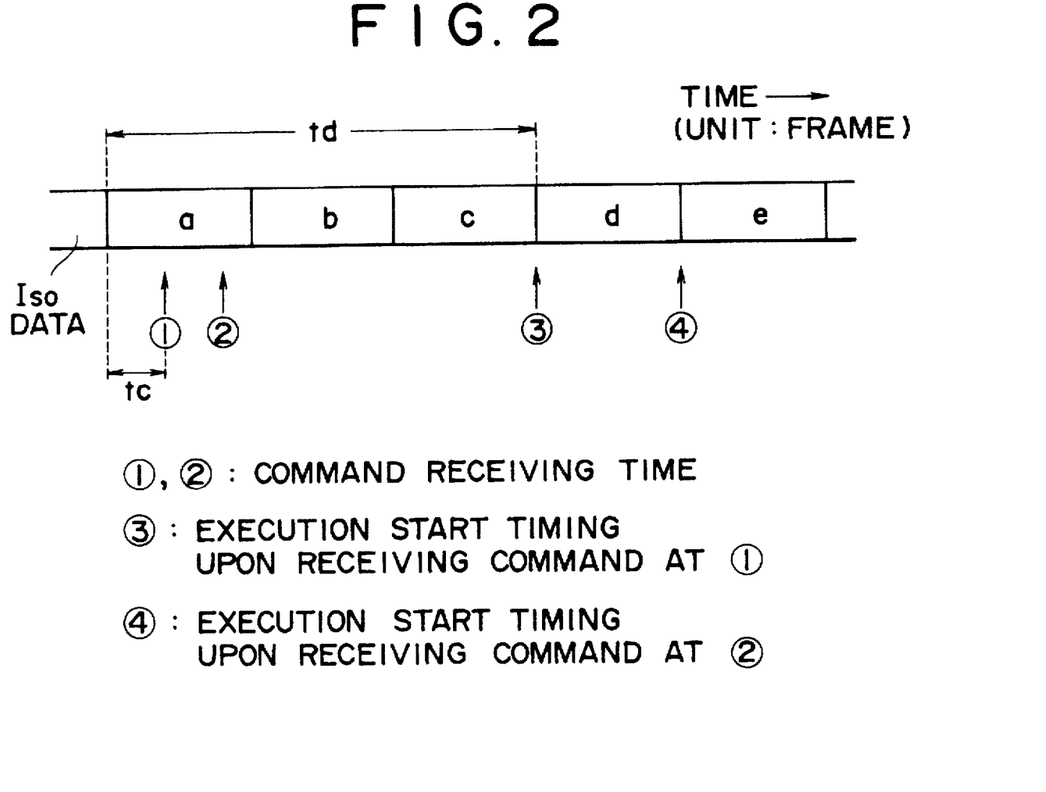
FIG. 2 is a diagram illustrating a command receiving time for ensuring a command processing time delay.

The time to is explained with reference to FIG. 2. When a command is received at time "1" elapsed by to from the top of frame a, the command execution is started at time 3 (top of frame d) after the expiration of the delay time td. On the other hand, if the command is received at time 2 later than the time to, the command execution is started at time 4 (at the top of the frame e) later by one frame than the time delay td at the frame c.

If the time from a frame boundary to the command sending timing is always made constant, the command can be sent without requesting the time tc.

(C) Detection of the top of a frame. Even if the time tc in the frame is thus recognized, it is further necessary to detect the top of the frame for determining the timing for actually sending the command.

Figure 3:
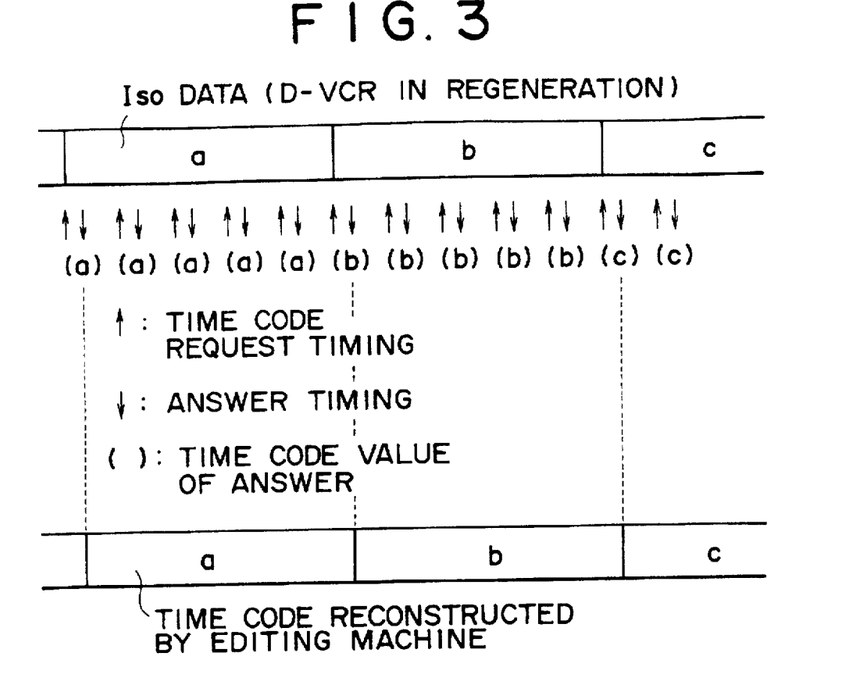
FIG. 3 is a diagram for explaining processing for detecting a frame boundary from a time code.

Then, in this embodiment, as shown in FIG. 3, the editing machine requests a time code continuously during the video data regeneration by the D-VCR. The editing machine then reconstructs a time code from the changing point in the time code obtained from a response to the request for detection of the frame boundary. In this method, the frame boundary of video data is aligned only if the time code transmitted by the asynchronous communication has no delay relative to a time code in system data transmitted by the isochronous communication.

Figure 4:
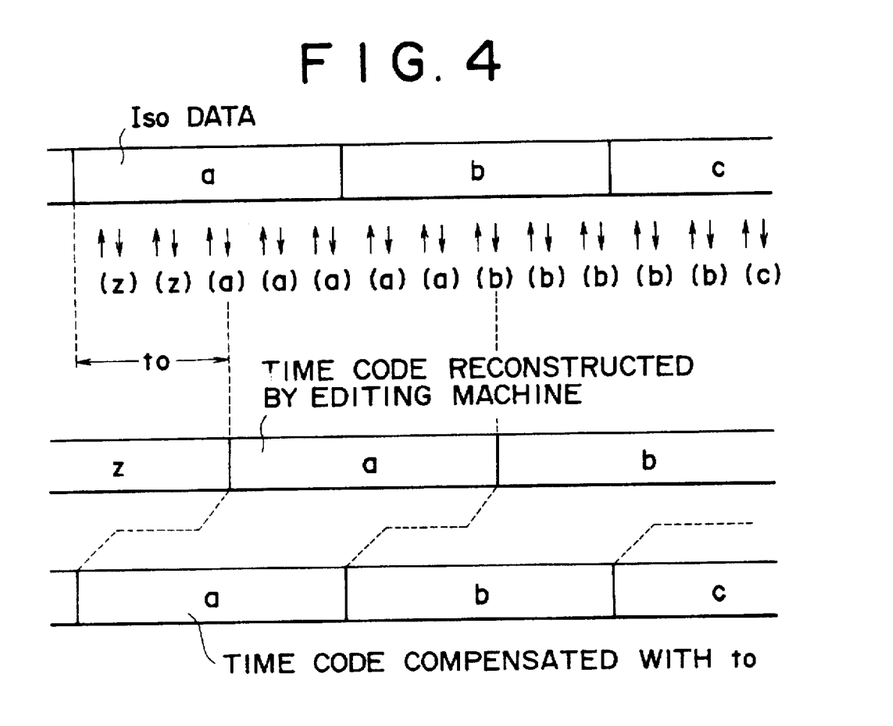
FIG. 4 is a diagram illustrating a delay of a time code obtained by asynchronous communication from the time code in isochronous communication data.

In this respect, in view of the system design of D-VCR, a time code provided via the asynchronous communication sometimes makes a delay relative to a time code in system data transmitted by the isochronous communication. Then, as shown in FIG. 4, in this embodiment, a time code compensated with the time delay is reconstructed to distinguish the boundary of the frame.

Figure 5:
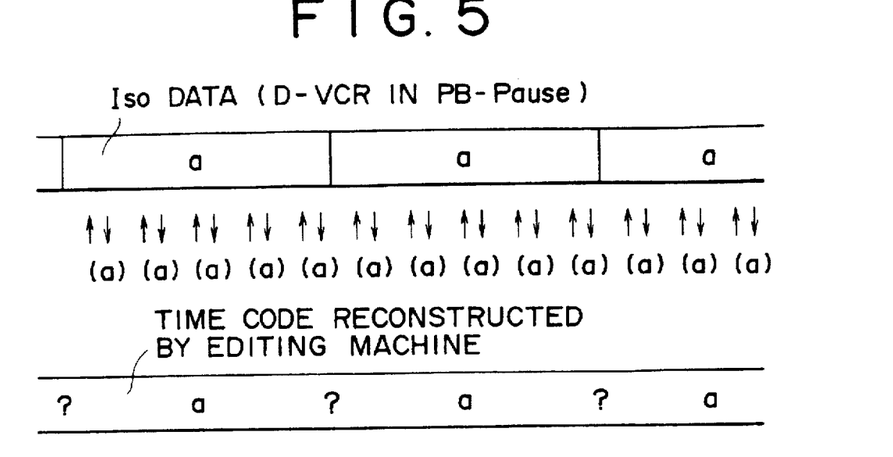
FIG. 5 is a diagram illustrating an example of isochronous communication data and time code in the PB-Pause state.

The frame boundary can thus be distinguished. However, since an identical value is always returned for every request about the time code as shown in FIG. 5 if D-VCR is in a PB (Playback)-Pause state or the like, the boundary of the frame cannot be detected in this situation.

Figure 6:
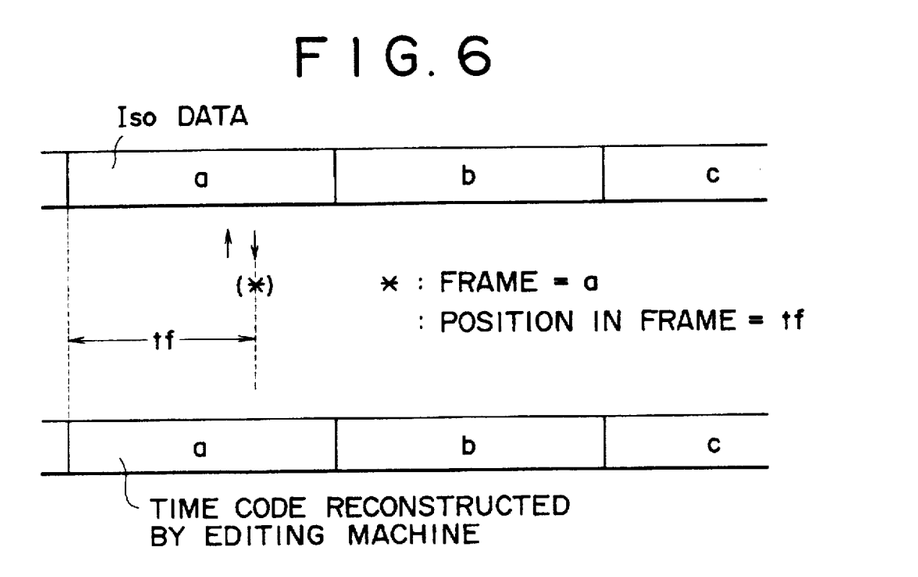
FIG. 6 is a diagram explaining the processing of adding time information from the top of the frame to the response of the time code.

Then, in this embodiment, two methods are considered for recognizing the frame boundary even if D-VCR is in the PB-Pause state. One of them is to add time information from the top of the frame as a response to the request for the time code, as shown in FIG. 6.

Figure 7:
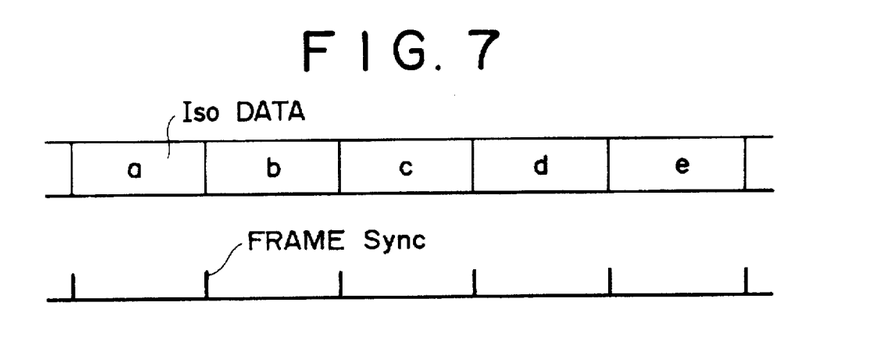
FIG. 7 is a diagram illustrating processing for extracting frame sync from a header of isochronous communication data.

The second method is to extract a frame sync from a header of the system data in the isochronous communication, as shown in FIG. 7. In this case, the editing machine requires a hardware for extracting the frame sync from the header.

(D) Example of an editing method in accordance with the present invention. Then, description will be made of conducting the editing procedure by using the method described above and as shown in FIG. 13, with reference to FIG. 8.

Figure 8:
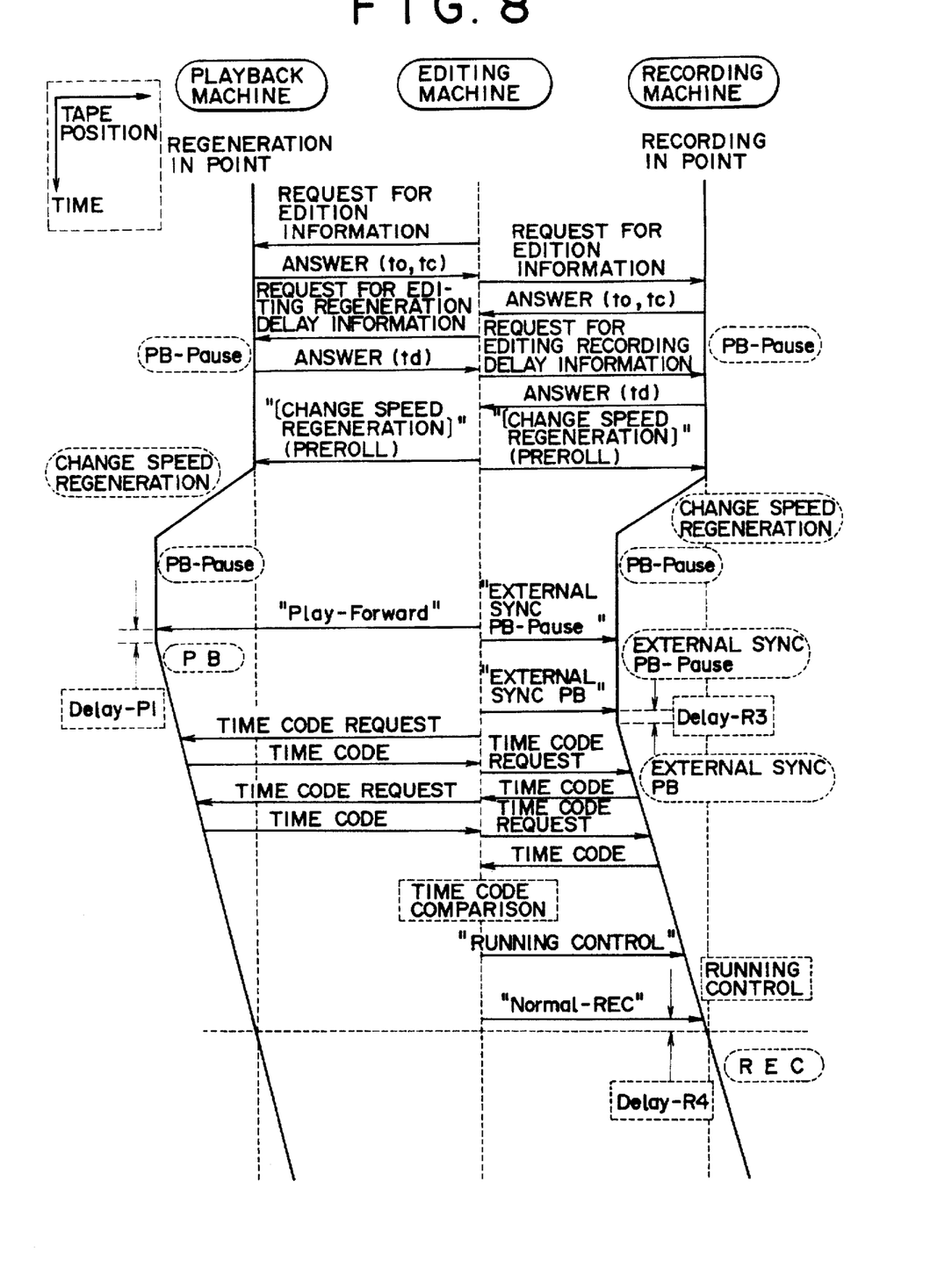
FIG. 8 is a diagram illustrating an example of an editing method to which the present invention is applied.

First, the editing machine requests the time delay to and tc from the playback machine, receives an answer from the playback machine and, successively, requests the time delay to and tc from the recording machine in the same manner and receives an answer. Further, the editing machine requests the time delay td from the playback machine and receives an answer from the playback machine and, successively, requests the time delay td from the recording machine and receives an answer. In this instance, the playback machine and the recording machine are in the PB-Pause state.

When the delay time is obtained from the playback machine and the recording machine, the tape position in the playback machine is prerolled for a predetermined period of time from the regeneration IN point (for example, 5 sec.) and, successively, the tape position in the recording machine is prerolled for a predetermined period of time (for example, for 5 sec) from the recording IN point.

Then, the editing machine sends a play-forward command to the playback machine. The playback machine executes the command upon expiration of the time delay PB-Pause→PB (Delay-P1) after receiving the command.

Thereafter, the editing machine sets the external synchronization PB-Pause mode for synchronizing the recording machine using a regenerated video signal of the playback machine. Further, the editing machine changes the recording machine from the external sync PB-Pause to the external sync PB. After receiving the command, the recording machine executes it upon expiration of the time delay (Delay-R3) of the external sync PB-Pause→external sync PB.

When both the playback machine and the recording machine are set in this way to the regeneration mode, the editing machine requests a time code from the playback machine and the video recording machine in order to examine the tape position in each. Then, the editing machine compares the time codes of the playback machine and the video recording machine and controls the running of the tape as required, such that the playback machine reaches the regeneration IN point simultaneously with the recording IN point. Then, the editing machine sends a recording command (normal-REC) at an instance earlier than the time delay (D-R4) of external sync PB→REC from the recording IN point, so that the recording machine is set accurately to the recording mode at the recording IN point.

Figure 9:
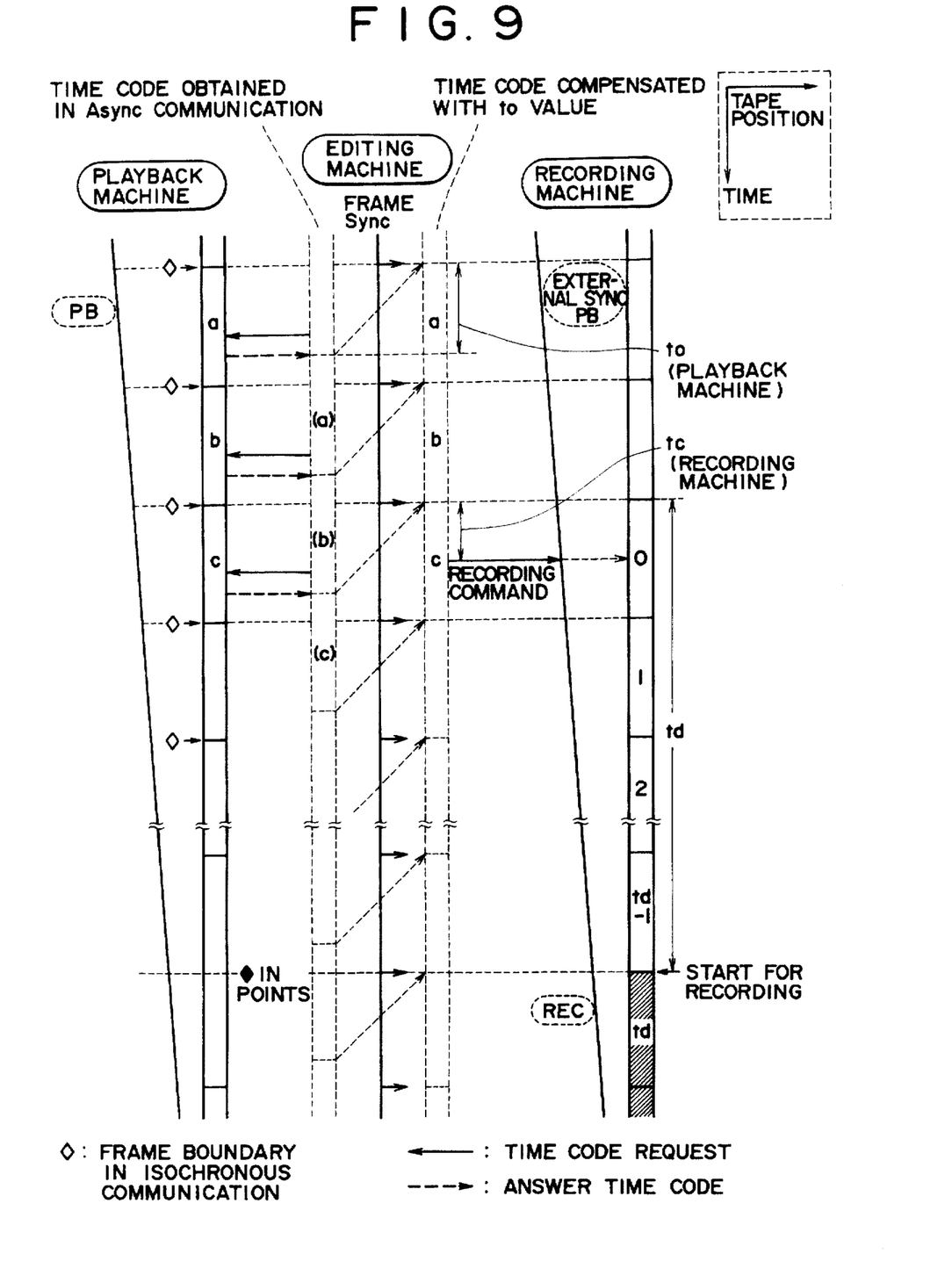
FIG. 9 shows a diagram of transmission time for various commands near video recording IN points of FIG. 8.

FIG. 9 shows the sending timing for various commands near the recording IN point of FIG. 8. This is an example for distinguishing the frame boundary based on the frame sync as has been explained previously with reference to FIG. 7. The present invention can also be constituted such that a time information tf from the top of the frame is added as the answer to an inquiry for the time code, as explained previously with reference to FIG. 6.

The foregoing embodiment concerns the 1:1 edit system assemble mode, but the present invention is applicable also to an A-B roll edit system or an insert mode editing procedure.

Further, the foregoing embodiment relates to the editing procedure in a communication system in which audio-video devices are connected by the P1394 serial bus. However, the present invention is applicable also to an edit system in which the editing machine cannot recognize the frame boundary in video signals in the edit system of FIG. 14, which comprises a plurality of analog or digital audio/video signal lines and an editing machine connected by control signal lines for sending and receiving commands and answers, respectively. In this embodiment, communication via the audio/video signal lines corresponds to the isochronous communication in the P1394 serial bus and communication via the control signal lines corresponds to the asynchronous communication.

What is claims:

1. A method for editing isochronous information arranged in a number of sections in a system having a plurality of devices and a communication control bus supporting at the same time isochronous and asynchronous modes of communication among devices in said plurality of devices, said devices including an edit control device for controlling, via a plurality of asynchronous predetermined commands, editing of said isochronous information at other devices in said plurality of devices, said method comprising the steps of:

transmitting by said edit control device a first command of said asynchronous predetermined commands to request, via said communication control bus, a first time delay from the other devices, said first time delay being an elapsed time between receipt and execution of one of said asynchronous predetermined commands by the other devices;

transmitting by said edit control device a second command of said asynchronous predetermined commands to request from the other devices, via said communication control bus, a time code of each of the sections, each of the time codes being used for detecting information representing boundaries of the sections based on a change of the time codes in said isochronous information;

determining a second time delay between each of the time codes received by said editing device and each respective actual time code in said isochronous information; and transmitting by said edit control device a third command of said asynchronous predetermined commands to perform editing of said isochronous information based on said first time delay, said second time delay and said information representing boundaries of the sections.

2. A method according to claim 1, further comprising the step of transmitting by said edit control device a fourth command of said asynchronous predetermined commands to request, via said communication control bus, time position information measured from a beginning of each of the sections for detecting said information representing boundaries of the sections when the time codes do not change in said isochronous information.

3. A method according to claim 1, wherein said one of the other devices is a digital video cassette recorder.

4. A method according to claim 1, wherein said one of the other devices is a digital editing device.

5. A system for editing isochronous information arranged in a number of sections in a configuration having a plurality of devices and a communication control bus supporting at the same time isochronous and asynchronous modes of communication among devices in said plurality of devices, said devices including one device for controlling, via a plurality of asynchronous predetermined commands, editing of said isochronous information at other devices in said plurality of devices, said apparatus comprising:

means for transmitting a first command of said asynchronous predetermined commands to request, via said communication control bus, a first time delay from the other devices, said first time delay being an elapsed time between receipt and execution of one of said asynchronous predetermined commands by the other devices;

means for transmitting a second command of said asynchronous predetermined commands to request, via said communication control bus, a time code of each of the sections from the other devices, each of the time codes being used for detecting information representing boundaries of the sections based on a change of the time codes in said isochronous information;

means for determining a second time delay between each of the time codes received by said editing device and each respective actual time code in said isochronous information; and means for transmitting a third command of said asynchronous predetermined commands to perform editing of said isochronous information based on said first time delay, said second time delay and said information representing boundaries of the sections.

6. A system according to claim 5, further comprising means for transmitting a fourth command of said asynchronous predetermined commands to request, via said communication control bus, time position information measured from a beginning of each of the sections for detecting information representing boundaries of the sections when the time codes do not change in said isochronous information.

7. A system according to claim 5, wherein said one device is an edit control device.

8. A system according to claim 5, wherein said one of the other devices is a digital video cassette recorder.

9. A system according to claim 5, wherein said one of the other devices is a digital editing device.

* * * * *